May 10, 1966  G. MYSKA  3,250,237
VALVE SYSTEM FOR CONTROLLING A PRESSURE FLUID TO A
THREAD CUTTER COMBINED WITH A SEWING MACHINE
Filed Feb. 26, 1964  3 Sheets-Sheet 2
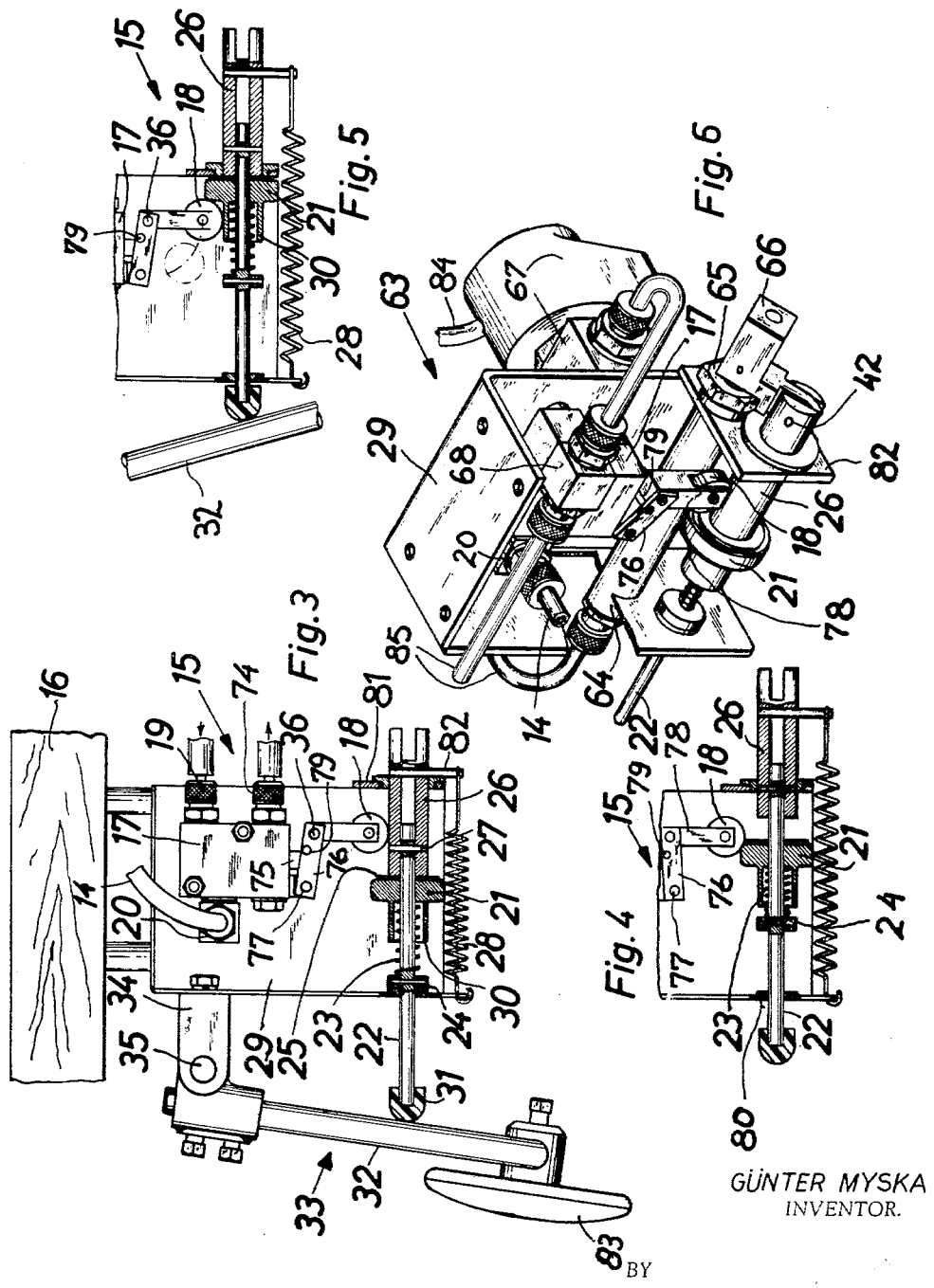
GÜNTER MYSKA
INVENTOR.
BY
AGENT May 10, 1966　　　G. MYSKA　　　3,250,237
VALVE SYSTEM FOR CONTROLLING A PRESSURE FLUID TO A
THREAD CUTTER COMBINED WITH A SEWING MACHINE
Filed Feb. 26, 1964　　　3 Sheets-Sheet 3

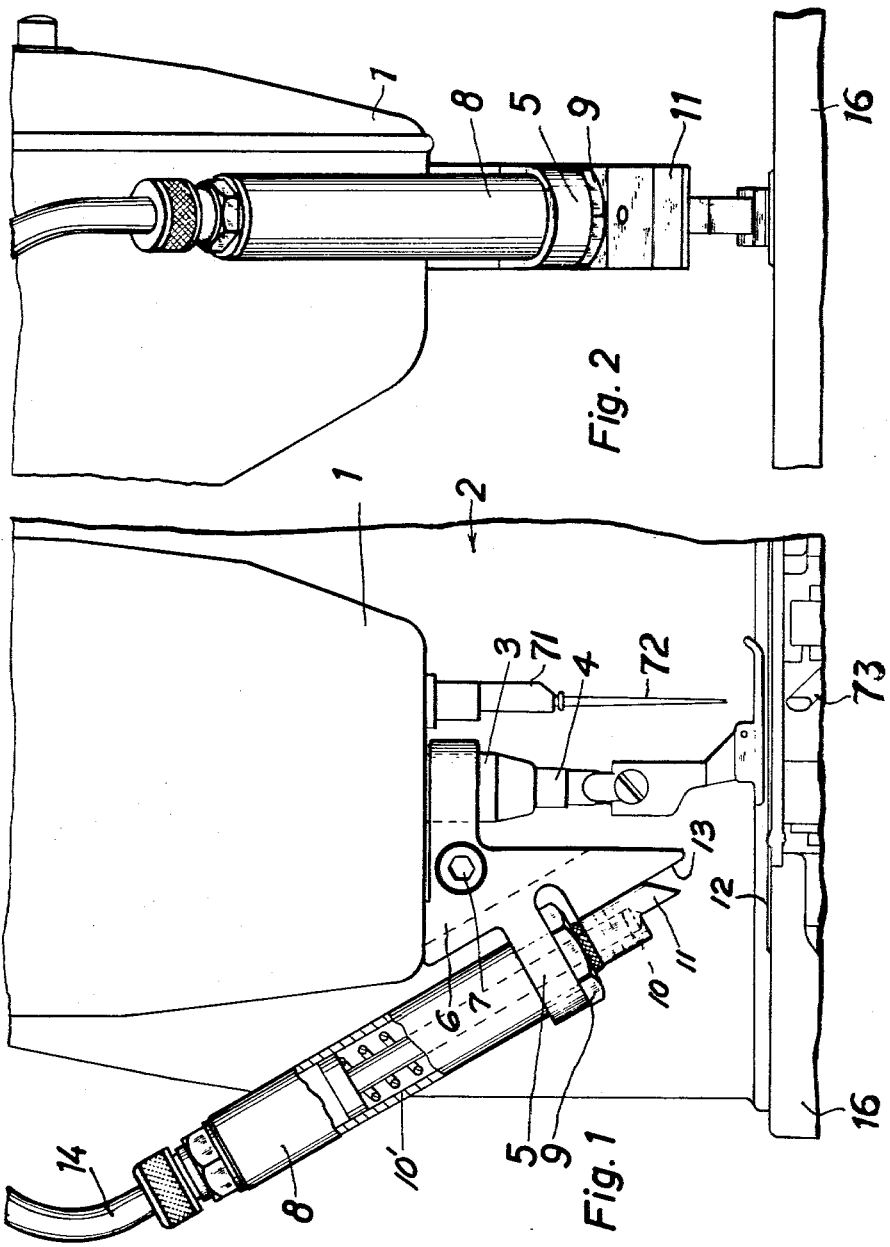

GÜNTER MYSKA
INVENTOR.

BY

AGENT

United States Patent Office 3,250,237
Patented May 10, 1966

3,250,237
VALVE SYSTEM FOR CONTROLLING A PRESSURE FLUID TO A THREAD CUTTER COMBINED WITH A SEWING MACHINE
Günter Myska, Bielefeld, Germany, assignor to Dürkoppwerke Aktiengesellschaft, Bielefeld, Germany, a corporation of Germany
Filed Feb. 26, 1964, Ser. No. 347,433
Claims priority, application Germany, Feb. 27, 1963, D 26,370
12 Claims. (Cl. 112—252)

My present invention relates to a system for momentarily unblocking a normally blocked conduit which serves for the admission of a pressure fluid to a hydraulically or pneumatically operated device which is to be moved only for a brief instant from a normal position of withdrawal. Typical for such devices is a thread cutter in a sewing machine which is to become effective only within a short interval during which the gap between two successive workpieces, still interconnected by a thread, moves past the stitch-forming implements of the machine.

It is, accordingly, the general object of this invention to provide a hydraulic or pneumatic control system of the type referred to which is of simple construction, inexpensive to manufacture and dependable in its operation.

A more particular object of this instant invention is to provide a system of this character whose response time is substantially independent of the rapidity of motion of a manually or otherwise displaceable operating element.

It is also an object of my invention to provide a system of this description whose operating element, reciprocable between a normal and an off-normal position, is so linked with an associated valve-control assembly that a single brief fluid pulse will be delivered during any reciprocation of that element.

A further object of the present invention is to provide automatic means for actuating a thread cutter of a sewing machine at the proper instant by a hydraulic or pneumatic pulse.

Briefly, a system embodying the invention includes a valve-actuating member, suitably biased to hold its valve normally closed, coupled with a cam follower such as roller positioned to co-operate with a cam entrainable by an advantageously rod-shaped operating element, the cam and the operating element being interlinked by a resilient connection which, upon an initial displacement of this element from its normal position, allows the cam to dwell temporarily in contact with the cam follower until the force of the resilient connection becomes strong enough to propel the cam past its follower, this action resulting in a momentary tripping of the actuating member to open and reclose the controlled conduit as the cam travels at increased speed beyond the follower.

If the coupling between the cam follower and the valve-actuating member is unidirectionally effective, as where the actuating member comprises a lever to which an arm forming part of the cam follower is pivoted for free swinging in one direction but only limited swinging in the opposite sense, the cam follower will yield upon a subsequent return stroke by which both the operating element and the cam thereof are restored to normal. In this case the return stroke may be brought automatically by, for example, a contractile spring attached to the operating element and to a fixed support.

In the field of application primarily contemplated for my invention, i.e. in a sewing machine, the operating element may be driven by a mechanism responsive to a photoelectric scanner which detects the instant at which an edge of a workpiece moves past a predetermined point in the vicinity of the stitch-forming means of the machine. More generally, however, the operating element may also be displaceable by manual action, this term being intended to cover any intervention by the human body via a handle, pedal, knee lever or other controller directly manipulated by the operator.

The invention will be described hereinafter in greater detail with reference to the accompanying drawing in which:

FIG. 1 is a side-elevational view of part of a sewing machine equipped with a pneumatically operated thread cutter according to the invention;

FIG. 2 is an end-elevational view of the assembly shown in FIG. 1;

FIG. 3 is an elevational view, partly in section, of the operating mechanism for the thread cutter of FIGS. 1 and 2;

FIGS. 4 and 5 are fragmentary elevational views of the assembly of FIG. 3, showing the mechanism in two different operative positions;

FIG. 6 is a perspective view of a modified mechanism for operating the thread cutter of a sewing machine;

Figure 7:
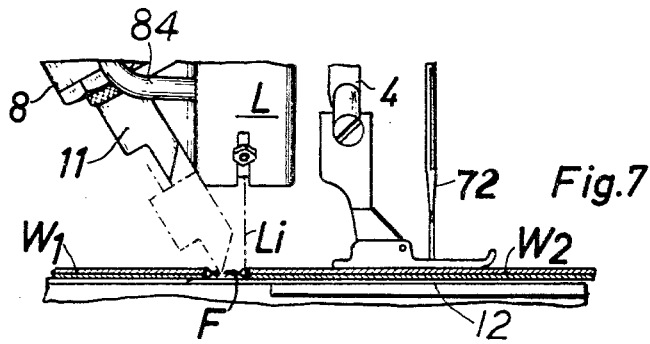
FIGS. 7–9 are views similar to FIG. 1, but drawn to a smaller scale, showing the operation of a photoelectric controller for the mechanism of FIG. 6.
Figure 8:
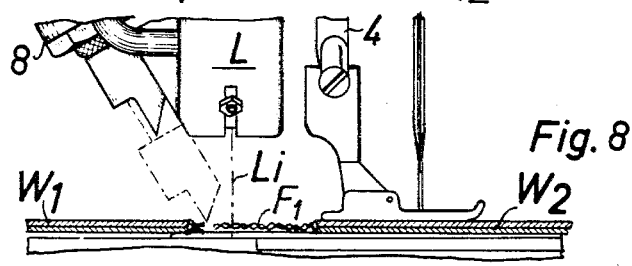
Figure 9:
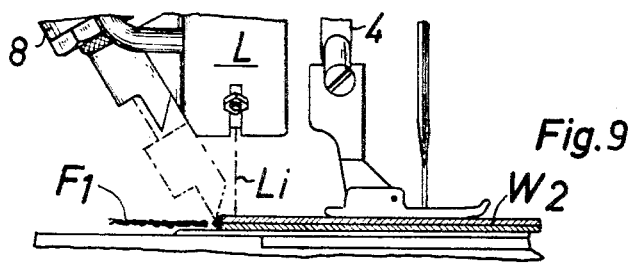

The conventional sewing machine 2 partly illustrated in FIGS. 1 and 2 comprises a head 1 with a depending guide sleeve 3 for the usual presser foot 4; the needle holder 71 with needle 72 co-operates in the known manner with the presser foot 4 and other stitch-forming means 73 below the needle plate 12 carried by the machine table 16.

Secured to the sleeve 3, and thus fixed with reference to the machine head 1, is a bracket 5 with a pair of clamping arms 6 which embrace the sleeve 3 under pressure of a mounting bolt 7. Bracket 5 supports a pneumatic cylinder 8 which is held in place thereon by a counternut 9 and has a piston 10 terminating in knife 11. This knife is slidable toward the needle plate 12 along an oblique edge 13 of bracket 5 which bears upon a flat guide surface on the knife body to prevent its rotation and to insure proper positioning of its cutting edge upon contact with the needle plate. The upper end of cylinder 8 is connected to a conduit 14 through which air under pressure may be admitted into the cylinder for lowering the knife against the force of a restoring spring 10' (FIG. 1), see also U.S. Patent No. 2,681,021.

Reference will now be made to FIGS. 3–5 for a description of a mechanism adapted to apply a brief operating pulse of compressed air to the cylinder 8 whenever the knife 11 is to be used to sever a trailing thread from a workpiece about to leave the vicinity of presser foot 4 and needle 72. This mechanism comprises a valve assembly 15 advantageously secured to the underside of the sewing-machine table 16. A housing 29, forwardly open as viewed in FIGS. 3–5, contains a pneumatic valve 17 with an inlet 19 for compressed air from a reservoir not shown, an outlet 74 for recirculating the air to the reservoir, and a main discharge port 20 connected to the conduit 14. An actuating pin 75 projects downwardly from the casing of valve 17 and is suitably biased (e.g. spring loaded) to hold the valve normally in a position in which outlet 74 communicates with inlet 19 to recirculate the oncoming compressed air, discharge port 20 being cut off. When the pin 75 is raised against its biasing force, outlet 74 is disconnected from inlet 19 which in turn communicates with port 20 to deliver operating fluid to the conduit 14. A lever 76, pivoted at 77 to the casing of valve 17, is hingedly connected at 36 to an arm 78 which bears a cam-follower roller 18. A stop 79 on lever 76 lies next to the arm 78 in such manner that the latter can freely swing clockwise about its fulcrum 36, as indicated in dot-dash lines in FIG. 5, but is blocked against swinging the opposite direction.

A cam disk 21 is freely slidable on a rod 22 which in turn passes slidably through a bearing 80 on housing 29, the other end of the rod being rigidly coupled with a tube 26 by means of a cross-pin 27; tube 26, slidable in a bearing plate 81 on housing 29, forms a laterally enlarged extension of rod 22 and thus constitutes an abutment for the same disk 21 which is normally urged against the tube 26 by a compression spring 23 interposed between the disk 21 and a fixed shoulder 24 on rod 22. A resilient buffer layer 25 is pressed on the face of disk 21 confronting the tube 26. The other face of disk 21 is integral with a trailing sleeve 30 which surrounds the rod 22 with clearance and receives one end of the spring 23. A contractile spring 28 extends alongside the rod 22 and is anchored at one end to the housing 29 and at its other end to a stud 82 projecting laterally from tube 26, thereby tending to maintain the slidable element 22, 26 in the normal position illustrated in FIG. 3. To facilitate the displacement into an off-normal position as shown in FIGS. 4 and 5, the free end of rod 22 carries a cap 31 (e.g. of synthetic resin) in contact with a lever 32 forming part of a manual controller 33; lever 32 is hinged at 35 to a lug 34 rigid with housing 29 and is provided with a convex disk 83 displaceable to the right, against the force of spring 28, by the knee of the machine operator.

FIGS. 3, 4 and 5 show successive positions of the rod 22 and associated parts during an operating stroke of controller 33. In the first phase of this stroke, as illustrated in FIG. 4, cam disk 21 comes to rest against roller 18 and lifts it slightly, along with arm 78, until lever 76 comes to bear upon actuating pin 75 of valve 17. At this instance the biasing resistance of pin 75 prevents further upward movement of roller 18 so that spring 23 is compressed while the assembly 22, 26 continues toward the right. When the restoring force of spring 23 has increased sufficiently to overcome the resistance of valve pin 75, roller 18 is cammed upwardly for a brief instant as the disk 21 is propelled further to the right by the expanding spring 23, the disk 21 finally abutting against the tube 26 in a position adjacent the bearing plate 81 in which the roller 18 is free to drop down past the disk 21 onto the trailing sleeve 30. When the operator subsequently releases the controller 23, spring 28 restores the system to normal without further displacement of the actuating pin 75 as the roller 18 swings clockwise to let the disk 21 pass. Thus, only a single pneumatic impulse is applied to the conduit 14 during a complete reciprocation of the assembly 21–26.

In FIGS. 6–9 I have shown an alternate embodiment in which the manual controller 33 of FIGS. 3–5 has been replaced by an automatic control unit generally designated 63. This unit includes a photoelectric device L (FIGS. 7–9) which emits a vertical beam of light $Li$ toward the needle plate 12, at a location just ahead of the cutting point of knife 11, and intercepts reflections of the beam from said plate to produce a signal delivered via a circuit 84 to a magnetic valve 67 (FIG. 6). A conduit 85 extends from the compressed-air reservoir (not shown) by way of a throttle valve 68 to the magnetic valve 67 and then to a pneumatic cylinder 64 disposed parallel to the rod 22 in housing 29. The piston rod (not shown) of cylinder 64 is rigid with a coupler 66 which is fastened by a pin 42 to the split outer end of the tube 26 for the operative entrainment of the assembly 21–26 upon the admission of air to the cylinder. A nut 65 serves to secure the cylinder 64 to the bearing plate 82.

As illustrated in FIG. 7, the system just described becomes operative when the gap between two successive workpieces $W_1$ and $W_2$ passes the region scanned by the beam $Li$. It will be noted that the cutting position of plate 11 (indicated in dot-dash lines) is offset from the beam $Li$ in such manner that this beam is intercepted by the leading edge of the next workpiece $W_2$ while the filament F interconnecting the two workpieces passes through the cutting position. The interruption of the light rays reflected toward the receiving photocell of photoelectrical detector L opens the magnetic valve 67 (FIG. 6) so that operating rod 22 moves forwardly, its cam disk 21 subsequently displacing the roller 18 in the aforedescribed manner to trip the valve 17 for an instantaneous operation of knife 11. The rod 22 and associated parts then remain in their off-normal position, corresponding to that in FIG. 5, until the trailing edge of workpiece $W_2$ clears the beam $Li$ whereupon the assembly is restored to normal, preparatorily to another thread-severing action as soon as the next-following workpiece reaches the position shown for the workpiece $W_2$ in FIG. 7.

The delay between the scanning of the workpiece edge by the beam $Li$ and the operation of the knife 11 to sever the thread F can be varied by suitable adjustment of the throttle valve 68.

If the separation of the workpieces is considerably greater than that shown in FIG. 7, i.e. if they are interconnected by relatively long threads $F_1$ (FIGS. 8 and 9) which should be trimmed off close to both workpieces, the cam-follower assembly associated with valve 17 may be modified in simple manner to provide for two successive cutting operations of the knife 11 during passage of the gap. To this end it is merely necessary to immobilize the arm 78 also in the counterclockwise direction with reference to the lever 76, e.g. with the aid of a simple setscrew not shown, so that the scanning of the trailing edge of workpiece $W_1$ will give rise to another fluid impulse in conduit 14 during the return stroke of rod 22. Since the displacement of the cam roller 18 in the course of this return stroke will not be as instantaneous as during the forward stroke, the cutting operation in the position of FIG. 8 will not be as rapid as in the previously described instances and the knife 11 may dwell somewhat longer on the needle plate 12. This, however, is of no consequence since enough clearance exists at this time between the knife and the next workpiece $W_2$ so that the movement of the latter will not be impeded. On the second severing stroke, illustrated in FIG. 9, the knife will again be lowered for only a short instance in the same manner as in the situation of FIG. 7.

Figure 10:
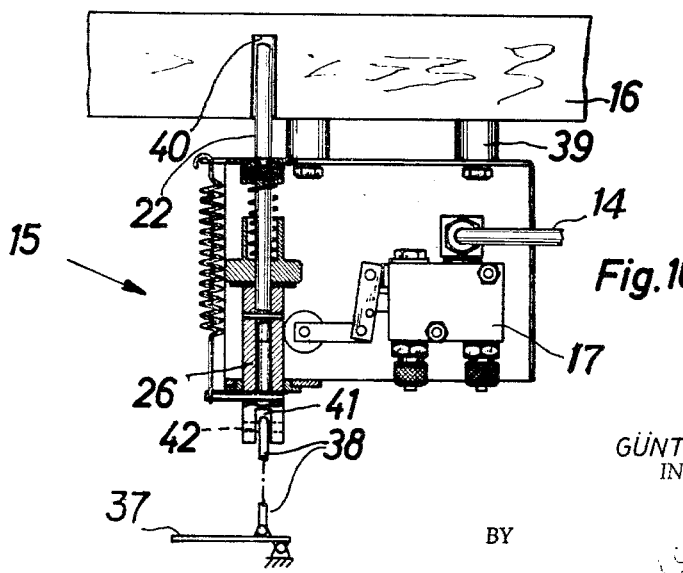
FIG. 10 is an elevational view of another modified mechanism similar to that of FIGS. 3–5.

In FIG. 10 I have shown the assembly 15 mounted below the table plate 16 in a manner slightly different from that of FIGS. 3–5. The table plate 16 is here provided with a recess 40 receiving the free end of operating rod 22 which is now positioned vertically rather than horizontally; the bifurcated opposite end 41 of tube 26 is hinged, via the aforementioned pin 42, to a lever 38 connected with a pedal 37 which thus represents another type of manual controller for the knife-actuating mechanism.

My invention is, of course, not limited to the specific structural details and mode of utilization herein disclosed, but may be modified in various respects and adapted for other uses without departing from the spirit and scope of the appended claims.

I claim:

1. In a sewing machine having stitch-forming means and cutter means adjacent said stitch-forming means for severing a thread stitched into a workpiece, the combination therewith of operating mechanism for said cutter means comprising a conduit connected to a source of fluid under pressure, a normally closed valve in said conduit, an actuating member for said valve biased to keep the latter closed, cam-follower means coupled with said actuating member, an operating element displaceable between a normal and an off-normal position, cam means positioned for co-operation with said cam-follower means, and a resilient connection linking said element with said cam means for yieldably entraining the latter into contact with said cam-follower means and after a temporary dwell propelling said cam means at increased speed past said cam-follower means with momentary tripping of said actuating member in the course of a displacement stroke of said element.

2. The combination defined in claim 1 wherein said mechanism further includes photoelectric control means adjacent said stitch-forming means for initiating a stroke of said element upon movement of a workpiece edge past a predetermined point.

3. In a sewing machine having stitch-forming means and cutter means adjacent said stitch-forming means for severing a thread stitched into a workpiece, the combination therewith of operating mechanism for said cutter means comprising a conduit connected to a source of fluid under pressure, a normally closed valve in said conduit, an actuating member for said valve biased to keep the latter closed, cam-follower means coupled with said actuating member, an operating rod slidable between a normal and an off-normal position, cam means slidably positioned on said rod for co-operation with said cam-follower means, and a resilient connection linking said rod with said cam means for yieldably entraining the latter into contact with said cam-follower means and after a temporary dwell propelling said cam means at increased speed past said cam-follower means with momentary tripping of said actuating member in the course of a displacement stroke of said rod.

4. The combination defined in claim 3 wherein said cam-follower means comprises a roller.

5. The combination defined in claim 3 wherein said rod is provided with an abutment for limiting the displacement of said cam means relative thereto under the control of said resilient connection.

6. The combination defined in claim 5 wherein said abutment is constituted by a laterally enlarged extension of said rod.

7. The combination defined in claim 3 wherein said cam means comprises a disk integrally provided with a trailing sleeve surrounding said rod with a clearance, said resilient connection comprising a compression spring partially received in said clearance.

8. In a sewing machine having stitch-forming means and cutter means adjacent said stitch-forming means for severing a thread stitched into a workpiece, the combination therewith of operating mechanism for said cutter means comprising a conduit connected to a source of fluid under pressure, a normally closed valve in said conduit, an actuating member for said valve biased to keep the latter closed, cam-follower means unidirectionally coupled with said actuating member, an operating element displaceable between a normal and an off-normal position, cam means positioned for co-operation with said cam-follower means, a resilient connection linking said element with said cam means for yieldably entraining the latter into contact with said cam-follower means and after a temporary dwell propelling said cam means at increased speed past said cam-follower means with momentary tripping of said actuating member in the course of a displacement stroke of said element, and restoring means for returning said element to its normal position with ineffectual entrainment of said cam means past said cam-follower means.

9. The combination defined in claim 8 wherein said actuating member includes a lever, said cam-follower means comprising an arm pivoted on said lever for free swinging in one direction and stop means limiting the swinging of said arm relative to said lever in the opposite direction.

10. The combination defined in claim 9 wherein said cam-follower means further comprises a roller on a free end of said arm.

11. In a sewing machine having stitch-forming means and cutter means adjacent said stitch-forming means for severing a thread stitched into a workpiece, the combination therewith of operating mechanism for said cutter means comprising a conduit connected to a source of fluid under pressure, a normally closed valve in said conduit, an actuating member for said valve biased to keep the latter closed, cam-follower means unidirectionally coupled with said actuating member, an operating rod slidable between a normal and an off-normal position, cam means slidably positioned on said rod for co-operation with said cam-follower means, and a resilient connection linking said rod with said cam means for yieldably entraining the latter into contact with said cam-follower means and after a temporary dwell propelling said cam means at increased speed past said cam-follower means with momentary tripping of said actuating member in the course of a displacement stroke of said rod, and restoring means for returning said rod to its normal position with ineffectual entrainment of said cam means past said cam-follower means.

12. The combination defined in claim 11 wherein said restoring means comprises a contractile spring extending alongside said rod and linking it with a fixed support therefor.

References Cited by the Examiner
UNITED STATES PATENTS

| | | | |
|---|---|---|---|
| 2,648,234 | 8/1953 | Lester | 74—107 |
| 2,681,021 | 6/1954 | Kindseth | 112—252 X |
| 2,824,436 | 2/1958 | Stack | 112—252 X |
| 2,882,847 | 4/1959 | Winz | 74—515 X |
| 2,909,936 | 10/1959 | Huthsing | 74—102 |
| 2,914,010 | 11/1959 | Cohen | 112—252 |
| 2,933,946 | 4/1960 | Thompson | 74—107 |
| 3,008,437 | 11/1961 | Herr | 112—252 |
| 3,094,031 | 6/1963 | Reeber | 112—252 X |

FRANK J. COHEN, *Primary Examiner.*

JORDAN FRANKLIN, *Examiner.*

M. J. COLITZ, J. R. BOLER, *Assistant Examiners.*